United States Patent [19]
Lerich

[11] 3,750,526
[45] Aug. 7, 1973

[54] EXPANSION BOLT WITH UNITARY WEDGE ASSEMBLY

[75] Inventor: Lester Lerich, Lakewood, Colo.

[73] Assignee: Wej-it Expansion Products, Inc., Broomfield, Colo.

[22] Filed: Feb. 4, 1970

[21] Appl. No.: 8,658

[52] U.S. Cl. .......................................... 85/79, 85/85
[51] Int. Cl. ............................................. F16b 13/06
[58] Field of Search .................... 85/67, 77, 78, 79, 85/85, 86, 87, 88, 63

[56] References Cited
UNITED STATES PATENTS

| 725,278 | 4/1903 | Newton | 85/86 |
|---|---|---|---|
| 1,066,040 | 7/1913 | Osborne | 85/85 |
| 2,267,420 | 12/1941 | Pleister | 85/85 |
| 3,257,891 | 6/1966 | Lerich | 85/79 |
| 3,277,770 | 10/1966 | McCulloch | 85/79 |
| 3,448,651 | 6/1969 | Passer | 85/77 |

FOREIGN PATENTS OR APPLICATIONS

| 16,349 | 8/1908 | Great Britain | 85/77 |
|---|---|---|---|
| 840,255 | 5/1952 | Germany | 85/78 |
| 913,838 | 6/1954 | Germany | 85/63 |

*Primary Examiner*—Marion Parsons, Jr.
*Attorney*—Reilly and Lewis

[57] ABSTRACT

A masonry anchor bolt is characterized by having a unitary wedge assembly which is preformed out of a blank of metal to comprise generally sleeve-like wedge members with a connecting bail between adjacent sides of the wedges so that the wedge assembly may be expanded into surrounding relation to an annular recess on the bolt surface, the connecting bail serving to maintain proper spacing and alignment of the wedge members both with respect to the recess and with respect to one another for selective automatic expansion of the wedge members along an inclined bearing surface into anchored engagement with the wall of the hole.

7 Claims, 7 Drawing Figures

PATENTED AUG 7 1973 3,750,526
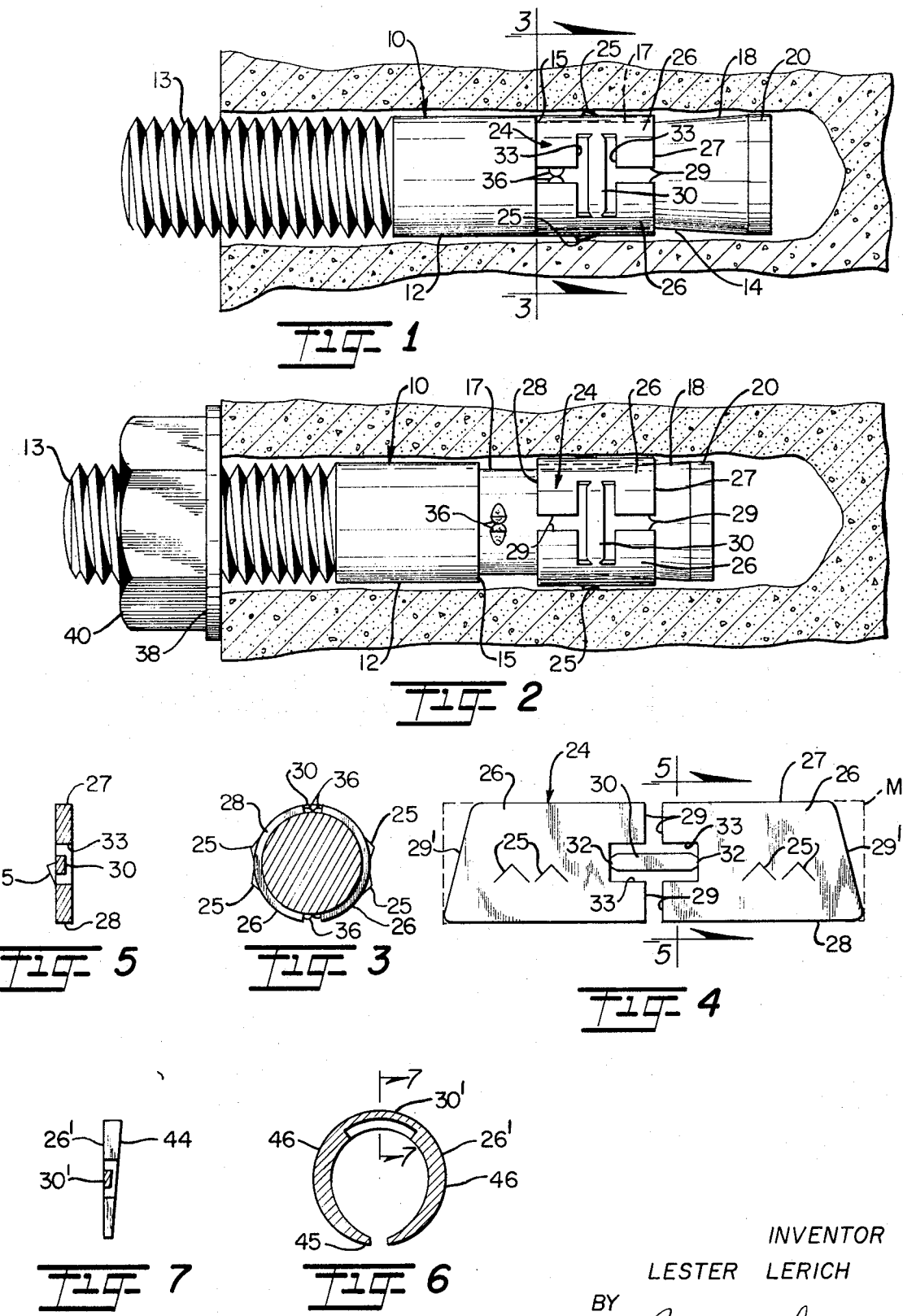
INVENTOR
LESTER LERICH
BY
Reilly and Lewis
ATTORNEYS

EXPANSION BOLT WITH UNITARY WEDGE ASSEMBLY

This invention relates to a novel and improved expansion bolt and more particularly relates to a masonry anchor bolt of the type provided with anchoring elements assembled on the bolt which are automatically displaceable into wedging engagement with the wall of a hole.

Masonry anchor bolts are customarily employed in fastening machinery, equipment and various members to masonry or rock structures. Typically, the bolt includes anchoring elements or wedge members which are disposed within a recess adjacent to the leading end of a bolt and are provided with some form of expansion means. The latter will permit the anchoring element normally to lie within the peripheral outline of the bolt so that the bolt can be inserted into a hole of corresponding diameter to the bolt; and when the bolt is advanced in the direction of withdrawal, or tightened, the expansion means will cooperate in displacing the anchoring elements along a forwardly divergent bearing surface into firm wedging engagement with the wall of the hole. Expansion bolts of this type are set forth and described in United States Letters Pat. No. 3,257,891, dated June 28, 1966, and No. 3,549,576, dated Apr. 22, 1969, both granted to the applicant of this invention. In each of the patents referred to there is specifically disclosed sleeve-like wedge members with spring-like expansion elements between facing side edges of the wedge members and adjacent to the trailing ends thereof to encourage outward radial expansion of the wedge members into firm anchoring engagement with the wall of the hole. For example, in the form shown in FIGS. 1 to 4 of said U.S. Pat. No. 3,439,576 the wedges are retained in assembled relation on the bolt by a connecting bail, and expansion means are engageable at the opposite trailing ends of the wedges to cause outward radial expansion of the wedge members into anchored engagement with the hole. Further, it is known to employ sleeve-like wedge members which are assembled in surrounding relation to the recess with the aid of a temporary retaining band which is ruptured or parted under the force of expansion of the wedge members.

In accordance with the present invention, it is highly desirable to simplify the fabrication and assembly of the wedge members on the bolt and specifically in such a manner that the entire wedge assembly can be preformed out of a single strip or blank of material with the necessary means for normally retaining the wedge members in assembled relation and for urging the wedges radially and outwardly for expansion into anchored engagement with the wall of the hole when the bolt is advanced in the direction of withdrawal from the hole. Moreover, it is proposed that the wedge members be so interconnected as to be maintained in exact alignment under forward displacement and expansion as well as to afford predictable movement of the wedges into anchored engagement so as to assure the maximum surface contact with the wall of the hole.

It is therefore an object of the present invention to provide in an expansion bolt for novel and improved wedge assemblies which can be simply fabricated, rapidly assembled on the bolt and is capable of predictable movement into uniform wedging engagemnt with the wall of the hole.

It is another object of the present invention to provide in an expansion bolt for a unitary wedge assembly comprised of a minimum number of parts which can be prefabricated and assembled on a bolt with the wedges maintained in proper alignment both with respect to one another and with respect to the bolt for rapid, automatic displacement into firm anchored relation to the wall of the hole.

It is a still further object of the present invention to provide for a novel and improved expansion bolt insertable into a blind hole corresponding in diameter to that of the bolt with a unitary wedge assembly normally contained within the peripheral outline of the bolt which is capable of rapid, automatic displacement into positive wedging engagement with the wall of the hole.

It is an additional object of the present invention to provide in an expansion bolt for a wedge assembly having improved expansion means which are capable of maintaining proper alignment of the wedges on the bolt upon insertion into a hole as well as to effect accurately predictable movement and outward expansion of the wedge members into anchored relation automatically upon tightening or advancement of the bolt in the direction of withdrawal from the hole.

In accordance with the present invention, a preferred form of masonry anchor bolt has two or more arcuate wedge members assembled in surrounding relation to a recess at the leading end of the bolt by a connecting bail which serves to interconnect adjacent, longitudinal side edges of the wedge members. Two adjacent side edges are not connected so as to permit expansion of the wedge members for assembly on the bolt and for subsequent outward radial expansion of the wedges into anchored engagement with the wall of the hole about fulcrum points formed by the connecting bail at its connection to the side edges of the wedge members. Preferably, the bail is extended into notches formed in the sides of the wedges and its points of connection are selectively weakened to provide the necessary flexibility of the wedges about selected points. In a preferred method of fabrication, connected wedge sections are formed out of a flat blank of metal with the outsides of the sections diverging forwardly to afford better surface contact in the hole; inner adjacent sides are selectively notched, preferably at the midsection as hereinbefore described, leaving a narrow connecting strip therebetween to define a connecting bail between the wedge sections. The strip is given additional resiliency or springiness by work-hardening and may also be selectively weakened or thinned down at its points of connection to the wedge sections. The flat wedge sections are then formed into substantially semi-circular configuration, and protrusions may be shaped in the middle of each wedge section to aid in outward expansion of the wedges.

The completed, unitary wedge assembly is assembled over the annular recess conventionally formed in the surface of the bolt simply by expanding the free side edges of the wedges and slipping the assembly laterally over the groove and compressing it down against the groove. Because of the memory of the spring-like bail, a slight spacing is left between the wedges and the surface of the recess. However, as the bolt is inserted into a hole substantially corresponding in size to that of the bolt, the wedges are compressed into the groove substantially within the peripheral outline of the bolt; under close-fitting engagement with the wall of the hole, the leading ends of the wedges will be compressed or contracted ahead of the trailing ends so that the wedges are cocked somewhat at the fulcrum of the points of interconnection of the bail of the wedges. Under expansion, the trailing ends, being cocked outwardly, will aid in outward expansion along the inclined bearing surface of the groove, and the bail will serve the important function of urging the wedges outwardly against the hole while maintaining exact alignment between the wedges.

The foregoing objects, advantages and features of the present invention will become more readily appreciated and understood from a detailed consideration of the invention taken in conjunction with the accompanying drawings, in which:

FIG. 1 is a side elevational view illusrating a preferred embodiment of the present invention inserted in a hole and prior to expansion of the unitary wedge assembly into anchored engagement with the hole.

FIG. 2 is a side elevational view similar to FIG. 1 but showing the unitary wedge assembly expanded into anchored relation to the wall of the hole.

FIG. 3 is a sectional view taken about lines 3—3 of FIG. 1.

FIG. 4 is a front view in elevation illustrating the formation of the preferred form of unitary wedge assembly out of a blank of metal.

FIG. 5 is a cross-sectional view of the unitary wedge assembly taken about lines 5—5 of FIG. 4.

FIG. 6 is a cross-sectional view of a modified form of unitary wedge assembly; and FIG. 7 is a sectional view taken about lines 7—7 of FIG. 6.

Referring in more detail to the drawings, there is illustrated in FIGS. 1 to 5 a preferred form of expansion bolt 10 made up of an elongated cylindrical shank member 12 having a threaded end section 13 at the external end of the shank. The opposite, leading end of the shank is provided with an annular recess or groove 14 which is formed in the external surface of the bolt shank 12 to define a circumferential shoulder portion 15 at its trailing end squared to the longitudinal axis of the bolt, a relatively deep groove surface 17 of uniform diameter adjacent to the shoulder portion verging into a forwardly divergent, inclined bearing surface 18 which terminates in a circular leading end section 20 corresponding in diameter to the diameter of the bolt shank.

An important feature of the present invention resides in the construction and arrangement of a unitary or one-piece wedge assembly 24 which is assembled on the bolt in surrounding relation to the groove surface 17. The wedge assembly is broadly comprised of sleeve-like or generally semi-circular wedge members 26 and each is provided with a leading end 27, a trailing end 29 and forwardly divergent longitudinal side edges 29. A connecting bail 30 extends circumferentially between two of the facing, longitudinal side edges 29 of the wedge members with opposite connecting ends 32 projecting into notches 33 formed in the adjacent sides of the wedges. The connecting bail 32 is dimensioned to be of a length which will maintain a slight spacing between adjacent side surfaces 29 and preferably the bail is selectively thinned or weakened at its points of connection 32 to the wedges to define a fulcrum for selective lateral expansion and contraction of the wedges in a manner to be described.

In the preferred form, the wedge members are of uniform thickness and are given a length and curvature corresponding to that of the grooved surface 17. As illustrated the wedge members are of arcuate configuration and of a width somewhat less than semi-circular to afford sufficient clearance or spacing for extension of the connecting bail between the wedges while permitting the wedges to be contracted substantially within the peripheral outline of the bolt shank 12 along the grooved surface 17.

The longitudinal side edges 29' of the wedge members opposite to the connected edges 29 are of course free to expand; and to install the wedge assembly onto the bolt shank the wedges are laterally expanded to a sufficient degree to clear the external diameter of the grooved surface portion 17 to permit the wedge assembly to be laterally advanced into position within the groove. When the wedge assembly is placed over the groove, it is contracted against the grooved surface portion, but of course the memory of the connecting bail will cause the wedges to spring outwardly a very slight extent so that there is a slight spacing between the inner surfaces of the wedges and the grooved surface. In addition, the diametrically opposed outward protrusions 36 are staked out of the grooved surface portion 17; and when the wedge assembly is placed over the groove and contracted against the groove surface, the protrusions are aligned to project outwardly into the spaces between the longitudinal side edges 29 and 29' so as to prevent rotation of the wedge assembly on the bolt.

As illustrated in FIG. 2, the expansion bolt can be anchored in the hole through the use of a washer 38 and nut 40 placed on the threaded end 13 of the bolt; and in a conventional manner, inward threading or tightening of the nut against the washer will cause advancement of the bolt in the direction of withdrawal from the hole. The slight outward spacing of the wedge assembly will cause the wedge members to engage the inner wall surface of the hole and to be displaced forwardly along the bearing surface 18 and at the same time to be radially expanded into firm wedging engagement with the wall of the hole. To further aid in outward expansion of the wedge members, the generally W-shaped or triangular protrusions 25 will aid in establishing initial contact with the wall surface and encourage forward displacement of the wedge members along the inclined bearing surface. In turn, the forwardly divergent sides 29' of the wedges will serve to establish a broad surface contact area across the leading ends 28 as they are initially expanded along the inclined bearing surface; and in expansion the wedges are maintained in exact alignment with one another by the connecting bail. In this relation, the bail will serve to provide the needed flexibility for outward radial expansion of the wedges but restrict relative longitudinal shifting or displacement of the wedge members with respect to one another so as to effect predictable movement of the wedges into balanced and uniform surface engagement with the wall of the hole.

In the preferred method of fabrication, the unitary wedge assembly 24 as described is fabricated out of a flat blank of material represented at M in FIG. 5, which for example may be of spring steel composition. The outline of the wedge sections is stamped out of the material leaving a slight spacing as shown between adjacent side edges 29 together with the aligned notches 33 and a relatively thin, narrow connecting strip which defines the bail 30 located at the midsection of the wedge assembly. The spring steel composition of the metal will give the wedge members some very limited flexibility, and additional flexibility or resiliency is built into the connecting strip 30 by work-hardening the strip, such as, by hammering or compressing into a relatively thin, narrow band approximating one-half the thickness of the wedge members. The strip is further thinned out or weakened at its connecting points 32 so that bending of the wedge members will take place about the connection points between the bail and wedge members. The protrusions 25 may be formed out of the thickness of the wedge sections, and the flat connected wedge sections may then be passed through a transfer die to form the wedges into circular configuration.

A modified form of wedge assembly is illustrated in FIG. 7 wherein the wedges 26' are formed out of a tapered blank so as to be given a forwardly tapered inner surface 44. In addition, opposite, free sides of the wedge members are selectively thinned or tapered as illustrated in FIG. 6 at 45 and 46 with a connecting bail 30' formed between adjacent sides in the manner described with reference to FIG. 5. In the modified form, the wedging action is the same as that described with respect to the preferred form in effecting automatic expansion of the wedges into firm positive engagement with the wall of the hole. In this relation, the wedge members may assume the configuration of a generally shovel-shaped wedge as illustrated in United States Letters Pat. No. 2,896,494 with the wedges assembled and interconnected by means of a lateral interconnecting bail as described in the present invention. This could be important in selected applications where more centralized or localized wedging action is preferred to the broadened surface contact obtained with the semi-circular wedge described in the preferred form.

While the invention has been particularly shown and described with reference to preferred embodiments thereof, it will be understood by those skilled in the art that various changes in form and details may be made therein without departing from the spirit of the invention.

What is claimed is:

1. In an expansion bolt having a shank portion adapted for insertion into a bolt hole of a diameter substantially corresponding to that of the shank portion, said portion including an annular recess therein, the combination therewith of a wedge assembly comprising at least two wedge members dimensioned for disposition in the recess substantially within the peripheral outline of said shank portion, said wedge members each having longitudinally extending side edges, and a connecting bail interconnecting adjacent sides of the wedges, said bail being in the form of a flat band of reduced thickness with respect to said wedge members and extending between and flush with the external surfaces of said wedge members and being relatively thin with respect to its width so as to permit flexing of said wedge members in a direction radially of said bolt while resisting independent longitudinal displacement of said wedge members, and the points of connection of said bail to said wedge members being selectively weakened in a direction to define fulcrums for radial bending of said wedge members with respect to said connecting bail whereby to permit selective outward expansion of said wedges about said bail when said wedges are displaced forwardly along the inclined bearing surface of said recess.

2. In an expansion bolt according to claim 1, said wedge members being of a cross-sectional curvature corresponding to that of said recess, and said connecting bail maintaining said wedge members in closely spaced relation to the surface of said groove prior to installation in the hole.

3. In an expansion bolt according to claim 1, said connecting bail being preassembled in connected relation to said wedge members.

4. In an expansion bolt according to claim 1, said wedge members being of uniform thickness with a cross-sectional curvature corresponding to the curvature of the groove.

5. In an expansion bolt according to claim 1, said wedge members tapering forwardly from the trailing toward the leading ends thereof.

6. In an expansion bolt according to claim 1, said wedge members each tapering circumferentially toward the outer free side portions opposite to the connected sides of said wedge members.

7. An expansion bolt comprising a shank portion insertable in a bolt hole with the wall of the hole substantially corresponding in diameter to that of said shank portion, said shank portion provided with an annular groove on its external surface and adjacent to its leading end having a relatively deep grooved surface portion of uniform diameter merging into a forwardly divergent, inclined external bearing surface, and a unitary wedge assembly prefabricated out of a blank of metal comprising a pair of wedge members normally disposed in surrounding relation to the grooved surface portion substantially within the peripheral outline of said shank and a connecting strip extending between the midsections of adjacent sides of said wedge members, said connecting strip being of reduced thickness with respect to said wedge members and extending flush with the external surfaces of said wedge members and spaced outwardly of the inner surfaces of said wedge members, said wedge members each tapering circumferentially away from connected sides toward outer free side portions opposite to the connected sides and being slidable forwardly along the external bearing surface into anchored relation to the wall of the hole when said shank portion is advanced in the direction of withdrawal from the hole; said wedge members being formed with outwardly extending protrusions on their external surfaces to aid in forward movement of said wedge members along the external bearing surface when said shank portion is advanced in the direction of withdrawal from the hole; protrusions on the surface of said groove to resist circumferential movement of said wedge members within the groove; and tightening means at the end of said shank portion opposite to said annular groove operative to advance said shank in the direction of withdrawal from the hole.

* * * * *